(12) United States Patent
Patterson

(10) Patent No.: US 8,089,170 B2
(45) Date of Patent: Jan. 3, 2012

(54) HIGH TORQUE STARTER/GENERATOR WITH LOW INPUT VOLTAGE

(75) Inventor: Stanley C. Patterson, Fall City, WA (US)

(73) Assignee: Astronics Advanced Electronic Systems Corp., Redmond, WA (US)

( * ) Notice: Subject to any disclaimer, the term of this patent is extended or adjusted under 35 U.S.C. 154(b) by 444 days.

(21) Appl. No.: 12/365,231

(22) Filed: Feb. 4, 2009

(65) Prior Publication Data

US 2010/0194203 A1 Aug. 5, 2010

(51) Int. Cl.
*H02J 9/00* (2006.01)
(52) U.S. Cl. ........................ 290/40 R; 290/46
(58) Field of Classification Search .......... 310/112–113; 290/40 R, 46–48; 244/53 A, 53 R
See application file for complete search history.

(56) References Cited

U.S. PATENT DOCUMENTS

| | | | | |
|---|---|---|---|---|
| 2,698,394 A | * | 12/1954 | Brown | 310/112 |
| 5,406,189 A | * | 4/1995 | Wohlberg et al. | 322/10 |
| 6,380,640 B1 | * | 4/2002 | Kanamori et al. | 290/40 C |
| 7,064,526 B2 | | 6/2006 | Patterson | |
| 2006/0180703 A1 | * | 8/2006 | Zielinski et al. | 244/57 |

* cited by examiner

*Primary Examiner* — Dang D Le
(74) *Attorney, Agent, or Firm* — Wiggin and Dana LLP

(57) ABSTRACT

An apparatus includes a plurality of starter/generator subsystems connected in parallel to a voltage distribution bus and to an input power supply. Each of the subsystems includes a starter/generator unit (SGU) for providing torque for starting an engine when the apparatus is operated in an engine start mode, and for generating power when the apparatus is operated in a generator mode. In an embodiment, each subsystem includes a power conversion unit (PCU) connected to the respective SGU, and each PCU includes an inverter section for rectifying voltage generated by the SGU when the apparatus is operated in the generator mode and may provide AC excitation voltage to operate the SGU as a motor to support the engine start mode.

20 Claims, 3 Drawing Sheets ns,170 B2

HIGH TORQUE STARTER/GENERATOR WITH LOW INPUT VOLTAGE

FIELD OF THE DISCLOSURE

This disclosure relates to starter/generator systems for engine applications where high starting torque is required, and in which power is derived from low voltage batteries or other low voltage sources.

BACKGROUND OF THE DISCLOSURE

Starter/generator systems for engine applications may be required to deliver high torque to an engine when in a starting mode, and operate efficiently at other times in a DC or AC generator mode. In a typical engine starter/generator system 10, shown schematically in FIG. 1A, a starter/generator subsystem 2 is coupled to an engine 3 and provided with power from a battery 1. In order to produce a high level of torque in engine starting mode, the starter/generator 2 typically requires a relatively high input voltage. For example, a typical 28 VDC aircraft starter/generator subsystem for generating 100 foot-pounds of engine starting torque at speeds up to 20% of rated speed (e.g., 2400 revolutions per minute (rpm) for a 12,000 rpm drive system), requires a minimum of 30,000 watts input power. If the source of that power is a nominal 24 VDC aircraft battery, the required current can exceed 1,800 amperes, and the battery voltage will typically drop to 16 volts or less during the engine start transient. This high level of input current to the starter/generator subsystem presents a significant problem in the design of the aircraft electrical distribution system.

A conventional method for providing higher input current is to increase the voltage of the power sources used to support engine starting. For example, as shown schematically in FIG. 1B, multiple batteries 11, 12 (each nominally 24 VDC) for an aircraft starter/generator may be connected in series during the engine start transient. The voltage distribution buses in the aircraft then must be configured differently to support engine starting and normal generator operation (nominal 48 VDC voltage for starting and 28 VDC voltage for generating). This complicates the distribution system design and control, particularly when aircraft safety requirements are considered.

It also is desirable to implement the starter/generator subsystem 2 as part of a fault tolerant system, in which one or more starter/generator functions are configured with redundant or multiple elements. Fault tolerant system architectures (including use of multiple isolated windings, incorporating redundancy in a machine and/or power controller/converter functions, etc.) are described in more detail in U.S. Pat. No. 7,064,526 (assigned to the same assignee as the present disclosure), the entire disclosure of which is incorporated herein by reference.

There is a need for a starter/generator system which can produce high levels of starting torque even when the input voltage to the starter/generator is relatively low, and which can be used in a fault tolerant power system architecture.

SUMMARY OF THE DISCLOSURE

The present disclosure provides an apparatus including a plurality of starter/generator subsystems connected in parallel to a voltage distribution bus and to an input power supply. Each of the subsystems includes a starter/generator unit (SGU) for providing torque for starting an engine when the apparatus is operated in an engine start mode, and for generating power when the apparatus is operated in a generator mode. In an embodiment, each subsystem includes a power conversion unit (PCU) connected to the respective SGU, and each PCU includes an inverter section for rectifying voltage generated by the SGU when the apparatus is operated in the generator mode.

According to another aspect of the disclosure, an apparatus includes a first starter/generator subsystem and a second starter/generator subsystem connected in parallel to a voltage distribution bus and to an input power supply. Each of the starter/generator subsystems includes a starter/generator unit (SGU) for providing torque for starting an engine when the apparatus is operated in an engine start mode, and for generating power when the apparatus is operated in a generator mode; and a power conversion unit (PCU) connected to the SGU. In an embodiment, each PCU includes an inverter section and a converter section. The inverter section rectifies voltage generated by the SGU when the apparatus is operated in the generator mode; the converter section is configured to upconvert the voltage of the input power supply to a voltage suitable to support engine starting when the apparatus is operated in the engine start mode, and downconvert the voltage generated by the SGU when the apparatus is operated in the generator mode. The first and second starter/generator subsystems are coupled to an aircraft engine having a required starting torque; each of the starter/generator subsystems provides approximately half the required starting torque.

The foregoing has outlined, rather broadly, the preferred features of the present disclosure so that those skilled in the art may better understand the detailed description of the disclosure that follows. Additional features of the disclosure will be described hereinafter that form the subject of the claims of the disclosure. Those skilled in the art should appreciate that they can readily use the disclosed conception and specific embodiment as a basis for designing or modifying other structures for carrying out the same purposes of the present disclosure and that such other structures do not depart from the spirit and scope of the disclosure in its broadest form.

DETAILED DESCRIPTION

Figure 1A:
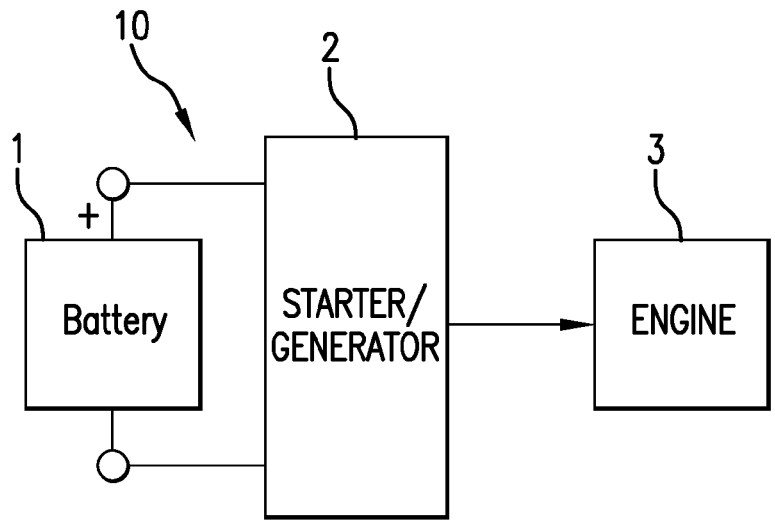
FIG. 1A is a schematic illustration of a conventional starter/generator subsystem for starting an engine, connected to a low voltage power source.
Figure 1B:
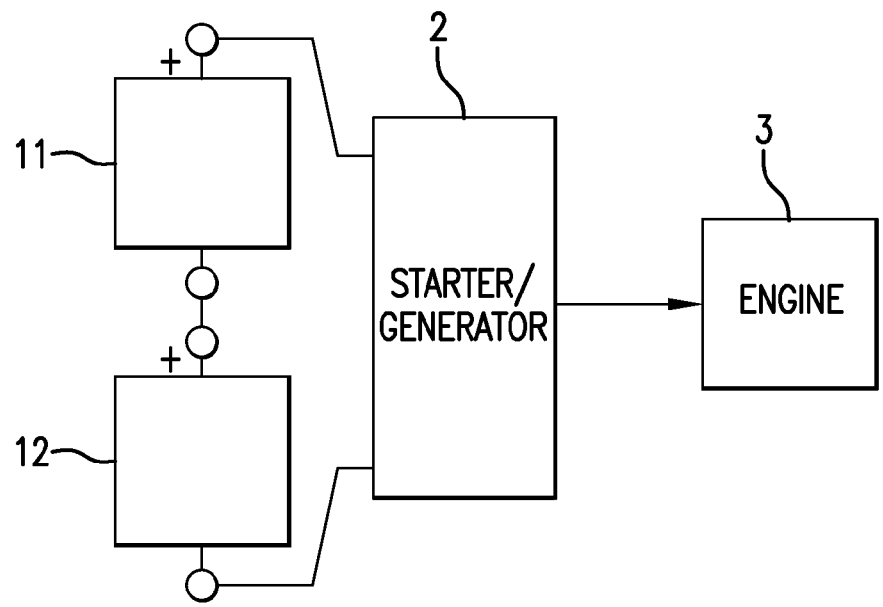
FIG. 1B is a schematic illustration of a conventional starter/generator subsystem where the starter/generator is coupled to a series connection of multiple power sources.
Figure 2:
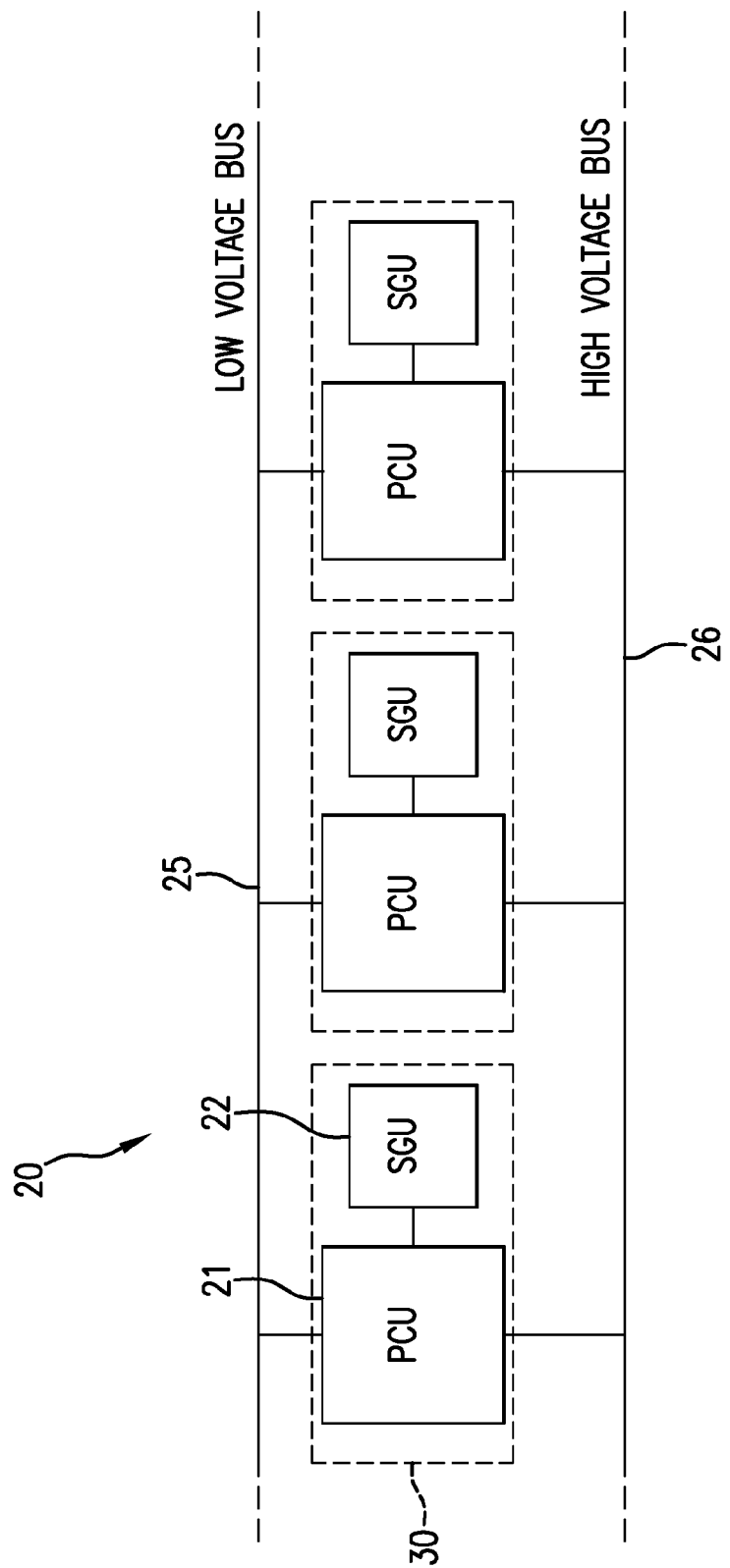
FIG. 2 is a schematic illustration of a parallel connected, high torque starter/generator system, in accordance with an embodiment of the disclosure.

FIG. 2 is a schematic illustration of an embodiment of the disclosure used in an aircraft engine starting application, in which multiple starter/generator subsystems 30 are connected in parallel. Each subsystem 30 includes a combination of a starter/generator unit (SGU) 22 and a power conversion unit (PCU) 21. Each PCU 21 is connected to a low voltage bus 25 which provides input power from a low voltage power source (not shown). In this embodiment, the power source for aircraft engine starting is an aircraft battery with a nominal voltage of 24 VDC. The PCU converts the battery power to a higher voltage form that is utilized to operate the SGU as a motor and provide the torque required to start the aircraft engines. When the engines are operating and the aircraft electrical system is operating in the generator mode, the SGU/PCU provides output power on the low voltage bus 25 to charge the aircraft batteries and support various aircraft electrical loads.

Each SGU/PCU combination 30 is connected to a high voltage distribution bus 26. As shown schematically in FIG. 2, an indefinite number of SGU/PCU combined units may be connected. Each of the SGU/PCU subsystems 30 contributes power for starting the aircraft engines in the engine start operating mode and/or supporting the aircraft electrical loads in the generator operating mode. With this configuration, starter/generator system 20 may produce high levels of torque even when the input voltage to an individual starter/generator is relatively low, because the required engine start current is essentially divided by the number of parallel SGU/PCU subsystems. It will be appreciated that this arrangement may also be used to support fault tolerant operation of the starter/generator system 20.

Figure 3:
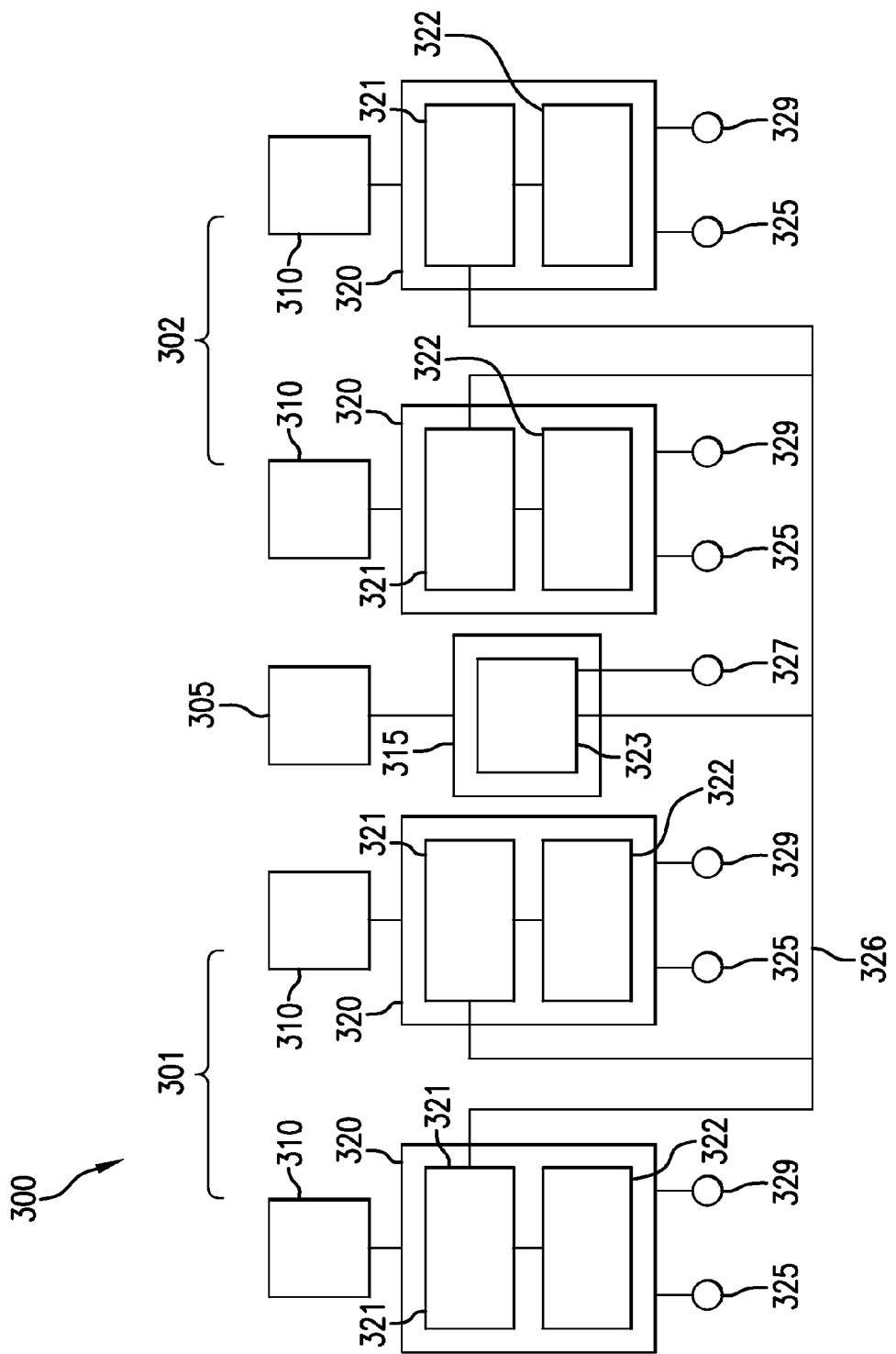
FIG. 3 is a block diagram of a high torque starter/generator system including multiple parallel power conversion units, in accordance with an embodiment of the disclosure.

FIG. 3 is a block diagram of a starter/generator system 300 for an aircraft engine application, according to an embodiment of the disclosure. System 300 is configured for starting two main aircraft engines (not shown), using two parallel sets of connected SGUs and PCUs 301, 302. Each SGU 310 provides approximately half of the torque required to start one engine. A PCU 320 is connected to each SGU; all the PCUs in the system are interconnected via a high voltage power sharing bus (voltage distribution bus) 326. Each SGU/PCU combination has a connection 325 for supplying low voltage DC input/output power; these input/outputs may be connected in parallel or electrically isolated as needed for the specific application. In this embodiment, the low voltage connection 325 receives 24 VDC aircraft battery power as an input when the system is operated in the engine start mode, and provides 28 VDC power to the aircraft loads when the system is operated in the generator mode. The low voltage DC connections 325 may be connected together to form a second, low voltage distribution bus connected to the aircraft battery.

Each PCU 320 in this embodiment includes an inverter section 321 and a converter 322. The inverter section 321 controls the start operation of the SGU/PCU subsystem while the system 300 operates in the engine start mode, and rectifies the generator AC voltage while the system operates in the generator mode. The inverter section 321 may provide AC voltage to excite the SGU when the apparatus is operated in the engine start mode. When the system operates in the generator mode, AC power is output from each PCU 320 at connection 329 (in this embodiment, 115 VAC at 3 kVA). The converter 322 is configured to upconvert the low voltage input power to a voltage suitable to support engine starting while the system is in the engine start mode, and downconvert the AC voltage from the SGU to a voltage suitable for aircraft loads while the system is in the generator operating mode (typically 28 VDC or 270 VDC).

It will be appreciated that starter/generator system 300 can operate effectively in both engine starting mode and generator mode. Since there is no need to configure the power sources or power distribution differently to support the different operating modes, the design of the electrical distribution system can be substantially simplified.

In this embodiment, an additional SGU 305 is coupled to an auxiliary power unit (APU) which provides additional power for starting the engines and for supporting aircraft loads. SGU 305 is connected to PCU 315 which includes an inverter section 323. Inverter section 323 is connected to high voltage bus 326. In this embodiment, the bus voltage is the same amplitude as the high voltage bus of all other PCUs. When the system operates in the generator mode, AC power is output from inverter section 323 at connection 327.

In alternative embodiments, the converter section of one or more of the PCUs may be omitted to reduce system weight, complexity and/or cost while still retaining the ability to start the engine and/or provide power to other PCUs by means of the high voltage sharing bus.

The system 300 is applicable for generators and/or starter/generators utilizing a number of machine design alternatives, including permanent magnet, AC induction, DC motor, switched reluctance and universal motor configurations. Applications may generally include aircraft or automotive applications requiring engine start operation and generation of DC and/or AC electrical power.

In an alternative embodiment, a PCU 320 may include a single assembly or multiple assemblies, located either adjacent to or remote from a machine. When the PCU is coupled to a motor, the PCU/motor interconnection may be provided via a low current feeder cable (where the motor/generator voltage is greater than the average bus voltage), or via a high current feeder cable (where the motor/generator voltage is equal to or less than the average bus voltage).

While the disclosure has been described in terms of specific embodiments, it is evident in view of the foregoing description that numerous alternatives, modifications and variations will be apparent to those skilled in the art. Accordingly, the disclosure is intended to encompass all such alternatives, modifications and variations which fall within the scope and spirit of the disclosure and the following claims.

I claim:

1. An apparatus comprising:
a plurality of starter/generator subsystems connected in parallel to a voltage distribution bus,
wherein each of the subsystems further includes
a first power connection for receiving power when the apparatus is operated in an engine start mode and for providing power when the apparatus is operated in a generator mode, said first power connection configured for a DC voltage lower than that of the voltage distribution bus,
a second power connection for providing power when the apparatus is operated in the generator mode, said second power connection configured for AC voltage, and
a starter/generator unit (SGU) for providing torque for starting an engine when the apparatus is operated in the engine start mode, and for generating power when the apparatus is operated in the generator mode.

2. An apparatus according to claim 1, wherein
each subsystem further includes a power conversion unit (PCU) connected to the respective SGU,
each PCU includes an inverter section for rectifying voltage generated by the SGU when the apparatus is operated in the generator mode, and
each PCU is connected to the respective second power connection for providing AC output power when the apparatus is operated in the generator mode.

3. An apparatus according to claim 2, wherein the inverter section provides AC voltage to excite the SGU when the apparatus is operated in the engine start mode.

4. An apparatus according to claim 2, wherein each PCU further includes a converter section configured to upconvert the voltage of the input power supply to a voltage suitable to support engine starting when the apparatus is operated in the engine start mode, and downconvert the voltage generated by the SGU when the apparatus is operated in the generator mode.

5. An apparatus according to claim 4, wherein the apparatus is configured to supply power to an aircraft when operated in the generator mode, and the converter section is configured to downconvert AC voltage generated by the SGU to a voltage suitable for aircraft electrical loads when the apparatus is operated in the generator mode.

6. An apparatus according to claim 1, wherein the apparatus is configured for starting an aircraft engine when operated in the engine start mode.

7. An apparatus according to claim 6, wherein the apparatus is also configured for generating power for aircraft electrical loads when the apparatus is operated in the generator mode.

8. An apparatus comprising:
a first starter/generator subsystem and a second starter/generator subsystem connected in parallel to a voltage distribution bus and configured for connection to an input power supply,
wherein each of the starter/generator subsystems further includes
a first power connection for receiving power when the apparatus is operated in an engine start mode and for providing power when the apparatus is operated in a generator mode, said first power connection configured for a DC voltage lower than that of the voltage distribution bus,
a second power connection for providing power when the apparatus is operated in the generator mode, said second power connection configured for AC voltage,
a starter/generator unit (SGU) for providing torque for starting an engine when the apparatus is operated in an engine start mode, and for generating power when the apparatus is operated in a generator mode, and
a power conversion unit (PCU) connected to the SGU and connected to the second power connection for providing AC output power when the apparatus is operated in the generator mode, each PCU including
an inverter section for rectifying voltage generated by the SGU when the apparatus is operated in the generator mode, and
a converter section configured to upconvert the voltage of the input power supply to a voltage suitable to support engine starting when the apparatus is operated in the engine start mode, and downconvert the voltage generated by the SGU when the apparatus is operated in the generator mode,
and wherein the first and second starter/generator subsystems are coupled to a first aircraft engine having a required starting torque, each of the starter/generator subsystems providing approximately half the required starting torque.

9. An apparatus according to claim 8, further comprising:
a third starter/generator subsystem and a fourth starter/generator subsystem connected in parallel to the voltage distribution bus and configured for connection to the input power supply, wherein the third and fourth starter/generator subsystems are coupled to a second aircraft engine having a required starting torque, each of the third and fourth starter/generator subsystems providing approximately half the required starting torque; and
a fifth starter/generator subsystem coupled to an auxiliary power unit (APU) for starting the first and second aircraft engines, the fifth starter/generator subsystem including a starter/generator unit connected to a power conversion unit including an inverter section,
the apparatus thereby forming a parallel connected starter/generator system for a set of two aircraft engines.

10. An apparatus according to claim 9, wherein the inverter section of the fifth starter/generator subsystem provides AC output power when the apparatus is operated in the generator mode.

11. An apparatus according to claim 8, wherein the apparatus is configured to supply power to an aircraft when operated in the generator mode, and the converter section is configured to downconvert AC voltage generated by the SGU to a voltage suitable for aircraft loads when the apparatus is operated in the generator mode.

12. An apparatus according to claim 8, wherein the inverter section provides AC voltage to excite the SGU when the apparatus is operated in the engine start mode.

13. An apparatus according to claim 8, wherein the input power supply comprises one or more aircraft batteries.

14. An apparatus according to claim 13, wherein the starter/generator subsystems and the aircraft batteries are connected via a DC low voltage distribution bus.

15. An apparatus comprising:
a first starter/generator subsystem and a second starter/generator subsystem connected in parallel to a voltage distribution bus and configured for connection to an input power supply,
wherein each of the first and second starter/generator subsystems includes
a starter/generator unit (SGU) for providing torque for starting an engine when the apparatus is operated in an engine start mode, and for generating power when the apparatus is operated in a generator mode, and
a power conversion unit (PCU) connected to the SGU, each PCU including
an inverter section for rectifying voltage generated by the SGU when the apparatus is operated in the generator mode, and
a converter section configured to upconvert the voltage of the input power supply to a voltage suitable to support engine starting when the apparatus is operated in the engine start mode, and downconvert the voltage generated by the SGU when the apparatus is operated in the generator mode,
and wherein the first and second starter/generator subsystems are coupled to a first aircraft engine having a required starting torque, each of the starter/generator subsystems providing approximately half the required starting torque;
a third starter/generator subsystem and a fourth starter/generator subsystem connected in parallel to the voltage distribution bus and configured for connection to the input power supply, wherein the third and fourth starter/generator subsystems are coupled to a second aircraft engine having a required starting torque, each of the third and fourth starter/generator subsystems providing approximately half the required starting torque; and
a fifth starter/generator subsystem coupled to an auxiliary power unit (APU) for starting the first and second aircraft engines, the fifth starter/generator subsystem including a starter/generator unit connected to a power conversion unit including an inverter section,
the apparatus thereby forming a parallel connected starter/generator system for a set of two aircraft engines.

16. An apparatus according to claim 15, wherein the apparatus is configured to supply power to an aircraft when operated in the generator mode, and the converter section is configured to downconvert AC voltage generated by the SGU to a voltage suitable for aircraft loads when the apparatus is operated in the generator mode.

17. An apparatus according to claim 15, wherein the inverter section provides AC voltage to excite the SGU when the apparatus is operated in the engine start mode.

18. An apparatus according to claim 15, wherein the input power supply comprises one or more aircraft batteries.

19. An apparatus according to claim 18, wherein the starter/generator subsystems and the aircraft batteries are connected via a DC low voltage distribution bus.

20. An apparatus according to claim 15, wherein the inverter section of the fifth starter/generator subsystem provides AC output power when the apparatus is operated in the generator mode.

* * * * *